US012583061B2

(12) United States Patent (10) Patent No.: US 12,583,061 B2
Yokoyama et al. (45) Date of Patent: Mar. 24, 2026

(54) SOLDER ALLOY, SOLDER PASTE, AND SOLDER JOINT

(71) Applicant: Senju Metal Industry Co., Ltd., Tokyo (JP)

(72) Inventors: Takahiro Yokoyama, Tokyo (JP); Shunsaku Yoshikawa, Tokyo (JP); Yuki Iijima, Tokyo (JP); Kanta Dei, Tokyo (JP); Takahiro Matsufuji, Tokyo (JP); Kota Sugisawa, Tokyo (JP); Shigeto Suzuki, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 19/103,045

(22) PCT Filed: Aug. 11, 2023

(86) PCT No.: PCT/JP2023/029383
§ 371 (c)(1),
(2) Date: May 22, 2025

(87) PCT Pub. No.: WO2024/034689
PCT Pub. Date: Feb. 15, 2024

(65) Prior Publication Data
US 2025/0276411 A1 Sep. 4, 2025

(30) Foreign Application Priority Data

Aug. 12, 2022 (JP) ................................. 2022-128651

(51) Int. Cl.
*B23K 35/26* (2006.01)
*B23K 35/02* (2006.01)
*C22C 13/02* (2006.01)
(52) U.S. Cl.
CPC .......... *B23K 35/262* (2013.01); *B23K 35/025* (2013.01); *C22C 13/02* (2013.01)
(58) Field of Classification Search
CPC .................................................... B23K 35/262
See application file for complete search history.

(56) References Cited

U.S. PATENT DOCUMENTS

| | | | |
|---|---|---|---|
| 9,221,129 B2 | 12/2015 | Imamura et al. | |
| 10,118,260 B2 | 11/2018 | Zhang et al. | |
| 11,167,379 B2 | 11/2021 | Iijima et al. | |
| 11,229,979 B2 | 1/2022 | Liu et al. | |
| 11,577,344 B2 | 2/2023 | Iijima et al. | |
| 11,633,815 B2 | 4/2023 | Hayashida et al. | |
| 11,819,955 B2 | 11/2023 | Kawasaki et al. | |
| 2015/0136461 A1 | 5/2015 | Imamura et al. | |
| 2016/0325384 A1* | 11/2016 | Liu ......................... | H01L 24/29 |
| 2020/0114475 A1 | 4/2020 | Izumita et al. | |
| 2022/0032406 A1 | 2/2022 | Iijima et al. | |

FOREIGN PATENT DOCUMENTS

| | | |
|---|---|---|
| CN | 111745321 A | 10/2020 |
| CN | 112475664 A | 3/2021 |
| CN | 113874158 A | 12/2021 |
| EP | 3321025 A1 | 5/2018 |
| EP | 3476520 A1 | 5/2019 |
| JP | 201428391 A | 2/2014 |
| JP | 201457974 A | 4/2014 |
| JP | 2018202436 A | 12/2018 |
| JP | 6730999 B2 | 7/2020 |
| JP | 2020104169 A | 7/2020 |
| JP | 6836040 B1 | 2/2021 |
| JP | 202226827 A | 2/2022 |
| KR | 1020200117042 A | 10/2020 |
| TW | 201410374 A | 3/2014 |
| WO | 2018181873 A1 | 10/2018 |
| WO | 2021043437 A1 | 3/2021 |

OTHER PUBLICATIONS

Office Action from the Canadian Intellectual Property Office for related Application No. 3,264,612 dated Jul. 16, 2025.
Office Action re: SG Patent Application No. 11202500965P, dated Nov. 5, 2025, 8 pages.

* cited by examiner

*Primary Examiner* — Jophy S. Koshy
(74) *Attorney, Agent, or Firm* — The Webb Law Firm

(57) ABSTRACT

Provided are a solder alloy, a solder paste, and a solder joint that exhibit a suitable melting temperature, are excellent in wettability, are high in tensile strength and shear strength, and are further excellent in drop impact resistance. The solder alloy has the following alloy composition. The alloy composition has an alloy composition consisting of, by mass %, Ag: 0.1 to 3.9%, Cu: 0.1 to 1.0%, Bi: 0.6 to 1.4%, Sb: 5.1 to 7.9%, Ni: 0.01 to 0.30%, Co: 0.001 to 0.100% or less, with the balance being Sn.

8 Claims, 1 Drawing Sheet

SOLDER ALLOY, SOLDER PASTE, AND SOLDER JOINT

CROSS-REFERENCE TO RELATED APPLICATIONS

This application is the United States national phase of International Patent Application No. PCT/JP2023/029383 filed Aug. 11, 2023, and claims priority to Japanese Patent Application No. 2022-128651 filed Aug. 12, 2022, the disclosures of which are hereby incorporated by reference in their entireties.

BACKGROUND

Field

The present invention relates to a solder alloy, a solder paste, and a solder joint.

Description of Related Art

In recent years, automobiles are being made high in functionality and high in performance through electrification of mechanical components. Electronic mounting technologies for achieving compact size and high density are deemed necessary to realize high functionality and high performance in automobiles. To accommodate such mounting technologies, high reliability of solder joints that connect printed circuit boards and electronic components is required.

For example, a printed circuit board installed in a vicinity of an engine is required to be used over a long term under a considerable temperature difference. In a hybrid automobile, an inverter that handles high electric power is installed and solder joints that can withstand the drive temperature of the inverter are required. Thus, high reliability of solder alloys that constitute the solder joints is required in electronic mounting technologies for automobiles and therefore, various examinations are being conducted.

In Japanese Patent Publication No. 6730999, is disclosed a solder alloy suited for a solder paste that is required to have high reliability under a high usage temperature or operating temperature of 150° C. or more. The solder alloy described in the document is an Sn—Ag—Cu—Ni—Bi—Sb—Co solder alloy with a liquidus-line temperature of 220° C. or more.

In Japanese Patent Publication No. 6836040, is disclosed an Sn—Ag—Cu—Ni—Sb—Bi—Co—P solder alloy that contains P for improving creep resistance. A solder alloy with which a liquidus-line temperature of the solder alloy is within a range of 250° C. or less is examined in an example of the document.

In Chinese Patent Application Publication No. 112475664, is disclosed a solder alloy capable of withstanding standing for 480 hours at 150° C. An Sn—Ag—Cu—Ni—Sb—Bi—Co—In solder alloy that contains In is examined in an example of the document.

In International Publication No. WO2021/043437, is disclosed a solder alloy that exhibits a comparatively high melting point for allowing long hours of operation, for example, under 150° C. or more in fields such as automobiles, high power electronics, energy, LED illumination, etc. For example, an Sn—Ag—Cu—Ni—Bi—Sb—Co—Ge solder alloy with a melting temperature of 220° C. or more is disclosed.

SUMMARY

In each of Patent Documents 1 to 4, an Sn—Ag—Cu—Ni—Bi—Sb—Co-based solder alloy with a liquidus-line temperature of 200° C. or more is disclosed to achieve the object of invention described in the corresponding document. For example, among SiC semiconductor devices, there is that which is capable of high temperature operation at 200° C. or more. If the melting point of a solder alloy is less than 200° C., the solder alloy melts during operation and cannot be applicable to a high-performance electronic component. The solder alloys described in Patent Documents 1 to 4 are considered to be capable of application to connection of electronic components that operate at high temperatures as described above. However, as a solder joint, even when heat resistance is satisfied, other characteristics are poor in some cases.

With the invention described in Japanese Patent Publication No. 6730999, although wettability is not evaluated, it is mentioned in paragraph 0043 of the document that Bi lowers a surface tension of a melted solder to improve wettability. Therefore, with the invention described in Japanese Patent Publication No. 6730999, it is preferable to contain a large amount of Bi to improve the wettability.

On the other hand, with the invention described in Japanese Patent Publication No. 6730999, a tensile strength after standing under high temperature is evaluated. And it is described in the paragraph mentioned above that: "the Bi addition increases the alloys strengths, but reduces its ductility significantly, making solder joints brittle with decreased thermal fatigue resistance. In embodiments of the present disclosure, a Bi addition of 1.5 wt. % or below is preferred for harsh environment electronics applications." That is, it is mentioned that a lower content of Bi is preferable for electronic device applications under harsh environments. Thus, with the invention described in Japanese Patent Publication No. 6730999, it is preferable to decrease the content of Bi. In view of the above, the Sn—Ag—Cu—Ni—Bi—Sb—Co solder alloy mentioned above disclosed in Japanese Patent Publication No. 6730999 is poor in wettability since the content of Bi is decreased for the purpose of improving the tensile strength after standing under high temperature.

The Sn—Ag—Cu—Ni—Sb—Bi—Co—P solder alloy that contains P is described in Japanese Patent Publication No. 6836040. The excellent invention that contains P for improvement of creep resistance is disclosed in Japanese Patent Publication No. 6836040. However, the invention described in Japanese Patent Publication No. 6836040 is mainly used in a preform. A solder powder constituted of a solder alloy that contains P has a possibility of aggregating and is thus rarely used as a solder paste. Also, when a large amount of P is contained, a liquidus-line temperature increases.

In Japanese Patent Publication No. 6836040, a solder alloy that does not contain P is disclosed in Comparative Example 12. However, although Comparative Example 12 of Japanese Patent Publication No. 6836040 is an Sn—Ag—Cu—Ni—Sb—Bi—Co solder alloy of the same constituent elements as in Japanese Patent Publication No. 6730999, it is poor in wettability due to being low in Bi content.

With the invention described in Chinese Patent Application Publication No. 112475664, wettability, tensile strength, heat cycle resistance, and heat resistance are evaluated. However, with the invention described in Chinese Patent Application Publication No. 112475664, characteristics particularly required of a solder joint that connects a vehicle-mounted electronic component and a substrate are not evaluated. For example, to be adapted even under an environment in which stress is applied from the exterior during travel on a rugged road, shear strength and drop impact resistance are required. These are effects that are required of the solder joint. Thus, with the invention described in Chinese Patent Application Publication No. 112475664, there is plenty of room for examination toward improving the shear strength and the drop impact resistance.

With the invention described in International Publication No. WO2021/043437, wettability, hardness, tensile strength, creep property, and cracks in a joint interface are evaluated. However, as with Chinese Patent Application Publication No. 112475664, shear strength and drop impact resistance are not evaluated. Therefore, as with the invention described in Chinese Patent Application Publication No. 112475664, there is plenty of room for examination toward improving the shear strength and the drop impact resistance with the invention described in International Publication No. WO2021/043437.

Thus, none of the conventional Sn—Ag—Cu—Ni—Bi—Sb—Co solder alloys, though being of the same constituent elements, satisfies all of the above-described effects at the same time. This is due to examinations focused on specific effects not being conducted in the conventional examinations. Since in recent years, the number of vehicle-mounted substrates is increasing in accompaniment with the electrification of automobiles, a solder alloy capable of satisfying various effects at the same time is being desired.

An object of the present invention is to provide a solder alloy, a solder paste, and a solder joint that exhibit a suitable melting temperature, are excellent in wettability, are high in tensile strength and shear strength, and are further excellent in drop impact resistance.

As solder alloys that exhibit suitable melting temperatures, the present inventors extracted alloy compositions disclosed in Patent Documents 1 to 4 and investigated the respective problems.

An Sn-3.54Ag-1.04Cu-0.05Ni-3.46Sb-0.29Bi-0.05Co solder alloy (numerical values represent mass % Japanese Patent Publication No. 6730999. In Japanese Patent Publication No. 6730999, it is disclosed that the liquidus-line temperature of this solder alloy is 226° C. and is of a suitable temperature. However, as mentioned above, it was found that this solder alloy is low in Bi content and poor in wettability.

It was found that the above-described solder alloy is poor in tensile strength. This is presumed to be due to solid solution strengthening and precipitation strengthening being insufficient due to the Bi content being low and solid solution strengthening by Sb also being insufficient due to the Sb content being low. It was also found that the shear strength is poor. This is presumed to be due to the Cu content being high and a coarse intermetallic compound precipitating at a joint interface.

An Sn-3.4Ag-0.70Cu-0.06Ni-6.0Sb-0.5Bi-0.008Co solder alloy is disclosed in Comparative Example 12 of Japanese Patent Publication No. 6836040. As with the solder alloy disclosed in Japanese Patent Publication No. 6730999, this solder alloy was found to be poor in wettability due to Bi content being low.

An Sn-3Ag-0.5Cu-0.05Ni-3.5Sb-7Bi-0.03Co-0.2In solder alloy is disclosed in Example 7 of Chinese Patent Application Publication No. 112475664. An Sn-3.5Ag-0.7Cu-0.05Ni-4Sb-3.1Bi-0.05Co-0.01Ge solder alloy is disclosed in Example 38 of International Publication No. WO2021/043437. Both of these solder alloys are considered to be poor in drop impact resistance. With both cases, it is presumed that segregation of Bi and embrittlement occurred due to the Bi content being high.

Thus with the conventionally examined Sn—Ag—Cu—Ni—Bi—Sb—Co solder alloys, adaptation to actual circumstances in consideration of the usage environment is difficult due to focus on a specific effect. However, it is considered that even with the same constituent elements as the conventional examples, there is a solder alloy that, while having a single alloy composition, exhibits a suitable melting temperature, is excellent in wettability, is high in tensile strength and shear strength, and is further excellent in drop impact resistance.

Here, in regard to the drop impact resistance, since a test substrate itself is dropped, all factors such as a strength of the substrate, a joint strength of a wiring and the substrate, etc. are included in the result. A factor of breakage in regard to the drop impact resistance thus does not necessarily lie in the solder alloy.

Thus, apart from the drop impact resistance, the present inventors focused on evaluating under harsher conditions than those for the drop impact resistance and conducted shear strength tests at speeds much higher than in conventional tests. This evaluation differs greatly in test conditions from conventionally performed shear strength tests and is an evaluation by which a fracture mode when a solder joint is fractured instantaneously can be observed.

In order to seek, from among conventional solder alloys, a solder alloy that exhibits all of the above-described effects at the same time, the present inventors made a detailed reexamination of all constituent elements. As a result, it was found for the first time that effects of levels acceptable for practical use are exhibited with respective constituent element contents for which effects have not been proven conventionally in Sn—Ag—Cu—Ni—Bi—Sb—Co solder alloys. In detail, it was found that by providing a single alloy composition in consideration of the alloy structure after melting and subsequent solidification of the solder alloy, in addition to exhibiting a suitable melting temperature, being excellent in wettability, being high in shear strength and tensile strength, and further being excellent in drop impact resistance, an appropriate fracture mode is exhibited in a high-speed shear test of breaking a solder joint instantaneously under harsher conditions than those for the drop impact resistance and the present invention was completed.

The present invention obtained by these findings is as follows.

(0) A solder alloy consisting of, by mass %,

Ag: 0.1 to 3.9%,

Cu: 0.1 to 1.0%,

Bi: 0.6 to 1.4%,

Sb: 5.1 to 7.9%,

Ni: 0.01 to 0.30%,

Co: 0.001 to 0.100%, with the balance being Sn.

(1) A solder alloy having an alloy composition consisting of, by mass %,

Ag: 0.1 to 3.9%,

Cu: 0.1 to 1.0%,

Bi: 0.6 to 1.4%,

Sb: 5.1 to 7.9%,

Ni: 0.01 to 0.30%,

Co: 0.001 to 0.100%, with the balance being Sn.

(2) The solder alloy according to (0) or (1) above, wherein the alloy composition further comprises, by mass %, at least one of In, Ga, As, Fe, Pd, Mn, Zn, Zr, and Mg: 0.1% or less in total.

(3) The solder alloy according to any one of (0) to (2) above, wherein the alloy composition satisfies at least one of the following relations (1) to (4):

$$426 \leq (Ag \times Cu)/(Ni \times Co) \leq 8530 \qquad \text{Relation (1)}$$

$$0.10 \leq Bi/Sb \leq 0.28 \qquad \text{Relation (2)}$$

$$10.8 \leq Sn/Sb \leq 18.0 \qquad \text{Relation (3)}$$

$$0.00004 \leq Bi \times Sb \times Ni \times Co \leq 0.00254 \qquad \text{Relation (4)}$$

wherein Sn, Ag, Cu, Bi, Sb, Ni, and Co in the relations (1) to (4) each represent the content in mass % thereof in the solder alloy.

(4) A solder paste comprising the solder alloy according to any one of (0) to (3) above.

(5) A solder joint comprising the solder alloy according to any one of (0) to (3) above.

DETAILED DESCRIPTION

Figure 1:
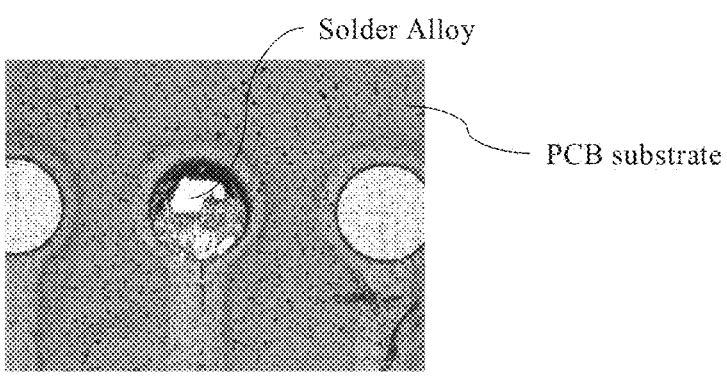
FIG. 1 is an optical micrograph of a PCB substrate surface after an HSS shear test in Example 5.

The present invention will be described in greater detail below. In this description, "%" relating to the solder alloy composition refers to "mass %" unless otherwise specified.

1. Solder Alloy (1) Ag: 0.1 to 3.9%

Ag improves the wettability of molten solder and suppresses increase in melting point. Further, Ag prevents joint interface fracture in a high-speed shear test (hereinafter referred to simply as "HSS") and decrease in drop impact resistance.

When the Ag content is less than 0.1%, the wettability of the molten solder degrades. In terms of the lower limit, the Ag content is 0.1% or more, preferably 0.5% or more, more preferably 1.0% or more, more preferably 1.4% or more, further preferably 2.0% or more, even further preferably 3.3% or more, and especially preferably 3.4% or more.

On the other hand, when the Ag content is more than 3.9%, a coarse $Ag_3Sn$ compound is formed and joint interface fracture occurs due to HSS. Also, in accompaniment with this, the drop impact resistance degrades. In terms of the upper limit, the Ag content is 3.9% or less, preferably 3.7% or less, and more preferably 3.5% or less.

(2) Cu: 0.1 to 1.0%

Cu improves the wettability of the molten solder. Also, Cu contributes to increase in tensile strength through precipitation strengthening of the solder alloy. Further, it can suppress joint interface fracture due to HSS. In addition, the shear strength is also improved.

When the Cu content is less than 0.1%, the wettability decreases. In terms of the lower limit, the Cu content is 0.1% or more, preferably 0.3% or more, more preferably 0.5% and further preferably 0.6% or more.

On the other hand, when the Cu content is more than 1.0%, the wettability degrades. Also, since a coarse $Cu_6Sn_5$ compound that crystallizes as a primary crystal precipitates in the bulk, the tensile strength degrades greatly. Further, since a $Cu_6Sn_5$ intermetallic compound and a $Cu_3Sn$ intermetallic compound grow coarsely at the joint interface, the shear strength degrades. In addition, joint interface fracture occurs due to HSS. In terms of the upper limit, an upper limit of the Cu content is 1.0% or less, preferably 0.9% or less, more preferably 0.8% or less, and further preferably 0.7% or less.

(3) Bi:0.6 to 1.4%

Bi improves the wettability. Also, by making the Bi content an appropriate amount, embrittlement is prevented and joint interface fracture due to HSS can be suppressed.

When the Bi content is less than 0.5%, the wettability decreases. In terms of the lower limit, the Bi content is 0.6% or more, preferably 0.7% or more, more preferably 0.8% or more, and further preferably 0.9% or more.

On the other hand, when the Bi content is more than 1.4%, joint interface fracture due to HSS occurs because of embrittlement. In terms of the upper limit, the Bi content is 1.4% or less, preferably 1.3% or less, more preferably 1.2% or less, further preferably 1.1% or less, and especially preferably 1.0% or less.

(4) Sb:5.1 to 7.9%

Sb is a solid solution strengthening type element that infiltrates the Sn matrix and forms a precipitation dispersion strengthening type solder alloy in which a portion exceeding the solid solubility limit in Sn forms a fine SnSb intermetallic compound. The tensile strength thus improves. Also, since embrittlement is less likely to occur in comparison to Bi, joint interface fracture due to HSS can be suppressed. Also, decrease in the drop impact resistance is prevented.

When the Sb content is less than 5.1%, the precipitation of the SnSb compound is insufficient and the tensile strength decreases. In terms of the lower limit, the Sb content is 5.1% or more, more preferably 5.3% or more, further preferably 5.5% or more, especially preferably 5.7% or more, and most preferably 6.0% or more.

On the other hand, when the Sb content is more than 7.9%, the wettability and the drop impact resistance decrease. Also, joint interface fracture occurs due to HSS. In terms of the upper limit, the Sb content is 7.9% or less, more preferably 7.5% or less, further preferably 7.0% or less, especially preferably 6.5% or less, and most preferably 6.3% or less.

(5) Ni:0.01 to 0.30%

Ni reacts with Sn to form an SnNi compound that precipitates dispersedly in the solder alloy and by the structure of the solder alloy being made fine, the tensile strength can be adjusted. Also, the drop impact resistance and the shear strength are improved and joint interface fracture due to HSS is suppressed. Further, Ni disperses uniformly in the intermetallic compound that precipitates near the joint interface between an electrode and the solder alloy and since an intermetallic compound layer is modified and fracture at the joint interface between the electrode and the solder alloy is suppressed, the shear strength is improved.

When the Ni content is less than 0.01%, the intermetallic compound layer is not modified, joint interface fracture occurs due to HSS, and the drop impact resistance also degrades. In terms of the lower limit, the Ni content is 0.01% or more, preferably 0.02% or more, more preferably 0.03% or more, further preferably 0.04% or more, especially preferably 0.05% or more, and most preferably 0.06% or more.

On the other hand, when the Ni content is more than 0.30%, the liquidus-line temperature increases and the wettability degrades. Also, the tensile strength degrades greatly due to a coarse SnNi compound that crystallizes as a primary crystal. Further, due to the intermetallic compound growing coarsely at the joint interface, the shear strength degrades and joint interface fracture occurs due to HSS. In terms of the upper limit, the Ni content is 0.30% or less, preferably 0.25% or less, more preferably 0.20% or less, further preferably 0.15% or less, especially preferably 0.10% or less, and most preferably 0.08% or less.

(6) Co:0.001 to 0.100%

By being added at the same time as Ni, Co improves the above-described effects of Ni and also, an SnCo compound formed by a reaction with Sn precipitates dispersedly in the solder alloy and the structure of the solder alloy becomes fine. The intermetallic compound formed at the joint interface also becomes fine and the shear strength is improved.

When the Co content is less than 0.001%, the synergistic effect with Ni cannot be exhibited and the shear strength degrades. In terms of the lower limit, the Co content is 0.001% or more, preferably 0.003% or more, more preferably 0.004% or more, further preferably 0.005% or more, especially preferably 0.006% or more, and most preferably 0.007% or more.

On the other hand, when the Co content is more than 0.100%, the wettability degrades. In terms of the upper limit, the Co content is 0.100% or less, preferably 0.090% or less, more preferably 0.080% or less, further preferably 0.070% or less, especially preferably 0.060% or less, and most preferably 0.050% or less.

(7) at Least One of in, Ga, as, Fe, Pd, Mn, Zn, Zr, and Mg: 0.1% or Less in Total In addition to the above-described essential elements, the solder alloy according to the present invention can contain, to an extent not degrading the effects of the present invention, at least one of In, Ga, As, Fe, Pd, Mn, Zn, Zr, and Mg at an amount of 0.1% or less in total. A lower limit, although not restricted in particular, may be 0.0001% or more.

(8) Balance: Sn

The balance of the solder alloy according to the present invention is Sn, and an unavoidable impurity may be contained in addition to the above-described elements. The solder alloy according to the present invention may be that with which the balance is constituted of Sn and the unavoidable impurity. Even when the unavoidable impurity is contained, it does not affect the above-described effects. Here, P is preferably not contained since the solder powder aggregates. Also, when a large amount of P is contained, the liquidus-line temperature increases.

(9) Melting Point

With the solder alloy according to the present invention, the liquidus-line temperature is preferably 210° C. or more and 251° C. or less and an upper limit is further preferably 235° C. or less. In consideration of drive temperatures of electronic components, the liquidus-line temperature is further preferably 218° C. or more. A solidus-line temperature suffices to be 210° C. or more. The solidus-line temperature is less than or equal to the liquidus-line temperature.

(10) Relations (1) to (4)

$$426 \leq (Ag \times Cu)/(Ni \times Co) \leq 8530 \qquad \text{Relation (1)}$$

$$0.10 \leq Bi/Sb \leq 0.28 \qquad \text{Relation (2)}$$

$$10.8 \leq Sn/Sb \leq 18.0 \qquad \text{Relation (3)}$$

$$0.00004 \leq Bi \times Sb \times Ni \times Co \leq 0.00254 \qquad \text{Relation (4)}$$

Sn, Ag, Cu, Bi, Sb, Ni, and Co in the relations (1) to (4) each represent the content in mass % thereof in the solder alloy.

The solder alloy according to the present invention preferably satisfies the relations (1) to (4). In regard to the relation (1), Ag and Cu are precipitation strengthening elements and Ni and Co are elements that contribute to the formation of fine precipitates at the joint interface. With the present invention, rather than improving just the tensile strength or just the shear stress, it is preferable to consider the balance of these such that with both effects, effects of levels acceptable for practical use are exhibited. Also, in consideration of the precipitation behavior of the solid phase in the molten solder, the wettability is also improved further. In addition, it is necessary to avoid fracture of the joint interface under HSS. Therefore, when the relation (1) is satisfied, the tensile strength and the shear strength are well-balanced, the wettability is more excellent, and the fracture at the joint interface due to HSS can be avoided.

In calculation of the relations (1) to (4), the numerical values indicated in Table 1, which are actually measured values of the alloy composition, were used. To confirm that all values used are made up of the same number of digits (based on the digits indicated in a lower limit value and an upper limit value of each relation) in the calculation, zeroes are added to the values indicated in the table. In regard to numbers that are not indicated, for example, when the Ag content is 1.00% as the measured value, the Ag content used in the calculation of the relations (1) to (4) is modified such as to include additional digits of "0" in accordance with the number of digits of the Ag content. The relations (1) to (4) are calculated using down to the third decimal place in the contents of the respective constituent elements. Then, based on the digits of the upper limit values and the lower limit values, calculation is performed by rounding to the first decimal place in the relation (1), rounding to the third decimal place in the relation (2), rounding to the second decimal place in the relation (3), and rounding to the sixth decimal place in the relation (4). This calculation rule is used in the present application and also, since all compositions must be handled by the same method, is used in calculations related to further combinations described in other documents. The Sn content in the relation (2) does not take into account the unavoidable impurity and the unavoidable impurity content is handled as 0 mass %. Therefore, just the essential constituents and the optional constituents are taken into account.

In terms of the lower limit, the relation (1) is preferably 426 or more, more preferably 595 or more, even more preferably 661 or more, further preferably 1063 or more, and especially preferably 1190 or more and may be 2975 or more, 3063 or more, 3188 or more, 4375 or more, 4958 or more, 5313 or more, 5950 or more, or 6563 or more. In terms of the upper limit, relation (1) is preferably 8530 or less and more preferably 7438 or less.

The relation (2) is a relation that indicates the balance of the Bi and Sb contents. Bi and Sb contribute to precipitation of a fine SnSb compound and by controlling the precipitation amount of the solid phase component of the molten solder, further improvement of the wettability can be achieved.

In terms of the lower limit, the relation (2) is preferably 0.10 or more, more preferably 0.11 or more, even further preferably 0.12 or more, further preferably 0.13 or more, especially preferably 0.14 or more, and most preferably 0.16 or more and may be 0.17 or more, 0.18 or more, 0.19 or more, or 0.20 or more. In terms of the upper limit, the relation (2) is preferably 0.28 or less, more preferably 0.27 or less, even further preferably 0.26 or less, further preferably 0.25 or less, especially preferably 0.24 or less, and may be 0.23 or less, 0.22 or less, or 0.21 or less.

The relation (3) is a relation that takes into consideration the balance of the Sn and Sb contents. In detail, due to the good balance of the effect of improving the tensile strength by the solid solution strengthening of Sn by Sb and the shear strength improvement effect due to the dispersed precipitation effect of the SnSb compound, further improvement of the tensile strength and the shear strength can also be achieved by the precipitation of fine SnSb.

In terms of the lower limit, the relation (3) is preferably 10.8 or more, more preferably 11.0 or more, even further preferably 11.1 or more, further preferably 12.5 or more, especially preferably 12.6 or more, and most preferably 14.7 or more and may be 14.8 or more, 15.6 or more, 15.7 or more, 16.2 or more, 16.3 or more, 16.9 or more, 17.0 or more or 17.5 or more. In terms of the upper limit, the relation (3) is preferably 18.0 or less, more preferably 17.7 or less, and further preferably 17.6 or less.

The relation (4) is a relation that takes into consideration the contents of the element group that contributes to the precipitation of the SnSb compound, the SnNi compound, and the SnCo compound. By the Bi, Sb, Ni, and Co contents being blended in a well-balanced manner, excessive hardening of the solder alloy is suppressed and joint interface fracture under HSS can be suppressed sufficiently. Also, the relation (4) is also a relation for contributing to further improvement of wettability since wettability is degraded by excessive addition of any of the elements.

In terms of the lower limit, the relation (4) is preferably 0.00004 or more, more preferably 0.00010 or more, even further preferably 0.00020 or more, further preferably 0.00041 or more, especially preferably 0.00098 or more, and most preferably 0.00102 or more and may be 0.00106 or more, 0.00109 or more, 0.00115 or more, 0.00131 or more, 0.00134 or more, 0.00136 or more, 0.00141 or more, 0.00146 or more, 0.00152 or more, or 0.00154 or more. In terms of the upper limit, the relation (4) is preferably 0.00254 or less, more preferably 0.00253 or less, even further preferably 0.00246 or less, further preferably 0.00245 or less, especially preferably 0.00237 or less, and most preferably 0.00230 or less and may be 0.00228 or less, 0.00224 or less, 0.00219 or less, 0.00211 or less, 0.00204 or less, 0.00196 or less, 0.00192 or less, 0.00182 or less, 0.00176 or less, 0.00170 or less, or 0.00163 or less.

2. Solder Paste

A solder paste of the present invention is a mixture of a solder powder having the alloy composition described above and a flux. A flux to be used in the present invention is not particularly limited as long as soldering by an ordinary method is possible. Therefore, that in which a generally-used rosin, organic acid, activator, and solvent are blended appropriately may be used. A blending ratio of the metal powder component and the flux component in the present invention is not particularly limited and is preferably metal powder component: 70 to 90 mass % and flux component: 10 to 30 mass %.

3. Solder Joint

A solder joint according to the present invention is suitable for use in connection of an IC chip and its substrate (interposer) in a semiconductor package or connection of a semiconductor package and a printed wiring board. Here, "solder joint" refers to a joint portion of an electrode.

4. Others

A method for producing the solder alloy according to the present invention is performed in the usual manner. A joining method using the solder alloy according to the present invention is performed in the usual manner by using, for example, a reflow method. Also, in the case of joining using the solder alloy according to the present invention, the structure can be made finer by taking a cooling rate for solidification into consideration. For example, a solder joint is cooled at a cooling rate of 2 to 3° C./s or more. Other joining conditions can be adjusted as appropriate according to the alloy composition of the solder alloy.

As the solder alloy according to the present invention, by using a low $\alpha$ dose material as a raw material, a low $\alpha$ dose alloy can be produced. Such a low $\alpha$ dose alloy can prevent a soft error when used for forming solder bumps around a memory.

EXAMPLES

Using solder alloys consisting of alloy compositions shown in Table 1, evaluations of evaluation 1: solidus-line temperature and liquidus-line temperature, evaluation 2: wettability, evaluation 3: tensile strength, evaluation 4: shear strength, evaluation 5: HSS shear test, and evaluation 6: drop impact resistance were made. Each of the evaluation methods are described below.

Evaluation 1. Solidus-Line Temperature and Liquidus-Line Temperature

Concerning the solder alloys consisting of the respective alloy compositions described in Table 1, the respective temperatures were obtained from DSC curves. The DSC curves were obtained with a DSC (model number: Q2000) manufactured by Seiko Instruments Inc., by raising the temperature at 5° C./min in the atmosphere. From each obtained DSC curve, the liquidus-line temperature was obtained and defined as a melting temperature. In addition, the solidus-line temperature was also evaluated from the DSC curve. A case where the solidus-line temperature was 210° C. or more and the liquidus-line temperature was less than 235° C. was judged as "Excellent." A case where the solidus-line temperature was 210° C. or more and the liquidus-line temperature was 235° C. or more and 251° C. or less was judged as "Good." A case where the solidus-line temperature was less than 210° C. or the liquidus-line temperature was more than 251° C. was judged as "Poor."

Evaluation 2. Wettability.

(1) Preparation of Test Plate

The wettability of the solder alloy was measured according to a method of the meniscograph test. A flux ("ES-1100" made by Senju Metal Industry Co., Ltd.) was applied onto a copper plate (10 mm width×30 mm length×0.3 mm thickness). The copper plate on which the flux was applied was heated at 120° C. for 15 minutes in the atmosphere, and a test plate was obtained. Five test plates obtained in this way were prepared for each example and each comparative example shown in Table 1.

(2) Evaluation Method

Each of the obtained test plates was immersed in a solder bath into which a molten solder having the alloy composition shown in Table 1 was introduced, and a zero cross time (sec) was obtained. Here, as test equipment, Solder Checker SAT-5100 (manufactured by RHESCA CO., LTD.) was used, and evaluation was made as follows. Based on an average value of zero cross times (sec) of five test plates of each of the examples and comparative examples, the solder wettability was evaluated. Test conditions were set as follows.

Immersion speed into solder bath: 10 mm/sec
Immersion depth into solder bath: 4 mm
Immersion time into solder bath: 10 sec
Solder bath temperature: 255° C.
A shorter average value of the zero cross time (sec) means higher wetting speed and higher solder wettability.

(3) Judgment Criteria

A case where the average value of zero cross times (sec) was 1.3 seconds or less was judged as "Excellent," a case where the average value was more than 1.3 seconds and 1.5 seconds or less was judged as "Good," and a case where the average value was more than 1.5 seconds was judged as "x."

Evaluation 3. Tensile Strength

The tensile strength was measured in accordance with JISZ3198-2. Each of the solder alloys described in Table 1 was cast into a mold and a test piece with a gauge length of 30 mm and a diameter of 8 mm was prepared. The prepared test piece was pulled at room temperature at a stroke of 6 mm/min by Type 5966 manufactured by Instron Inc. and the strength at the point at which the test piece broke was measured.

A case where the tensile strength was 60 MPa or more was evaluated as "Excellent," a case where the tensile strength was 55 MPa or more and less than 60 MPa was evaluated as "Good," and a case where the tensile strength was less than 55 MPa was evaluated as "Poor."

Evaluation 4. Shear Strength

A 3216 chip resistor component of 3.2×1.6×0.55 (mm) size was soldered onto a soldering pattern (1.6×0.8 mm) inside an FR4 glass epoxy substrate of 110 mm×110 mm size and 1.6 mm thickness. The soldering was performed by printing the solder paste onto the substrate using a metal mask of 150 μm thickness and thereafter heating in a reflow furnace at a peak temperature of 245° C. for a holding time of 40 seconds. Thereafter, the shear strength was measured using a joint strength tester STR-5100 under conditions of a shear speed of 6 mm/min and a test height of 100 μm from the substrate surface.

A case where the shear strength was 65 N or more was evaluated as "Excellent," a case where the shear strength was 45 to 64 N was evaluated as "Good," and a case where the tensile strength was less than 45 N was evaluated as "Poor."

Evaluation 5. HSS Shear Test

The HSS shear test was performed as follows. A solder ball of 0.3 mm diameter having an alloy composition of Table 1 was placed on a PCB substrate that uses an FR4 glass epoxy substrate of 36 mm×50.4 mm size and 1.2 mm thickness. Heating in a reflow furnace at a peak temperature of 245° C. for a holding time of 40 seconds was then performed. Thereafter, a shear test was performed at a shear speed of 4000 mm/sec (240000 mm/min) using a high speed bond tester 4000HS and the fracture mode was checked visually.

A case where the fracture mode was bulk fracture was evaluated as "Excellent," a case where the fracture mode was bulk fracture and joint interface fracture was evaluated as "Good," and a case where the fracture mode was joint interface fracture was evaluated as "Poor."

Evaluation 6. Drop Impact Resistance

A copper-plated CSP with an outer shape of 12×12 (mm) and having 196 electrode bumps was prepared. A solder paste was applied onto a center of a glass epoxy printed circuit board of 30×120 (mm), the CSP was mounted thereon, and the CSP was soldered onto the printed circuit board by heating in a reflow furnace.

Both ends of the printed circuit board with the CSP soldered thereon were fixed on a drop jig while providing an interval of 1 cm from the jig. An impact was applied to the printed circuit board by dropping the drop jig from a height of applying an acceleration of 1500G. In this process, a central portion of the printed circuit board with both ends fixed to the jig vibrates and the solder joint of the printed circuit board and the CSP receives the impact due to this vibration. The circumstance of development of cracks in the solder joint of the CSP in this drop test was checked by whether or not an electrical resistivity increased by 50% from an initial value.

A case where the number of times of dropping at which the electrical resistivity increased by 50% from the initial value was more than 100 was evaluated as "Excellent," a case where the number of times was 50 to 100 was evaluated as "Good," and a case where the number of times was less than 50 was evaluated as "Poor."

TABLE 1

| | ALLOY COMPOSITION (MASS %) | | | | | | | | | | |
| | Sn | Ag | Cu | Ni | Sb | Bi | Co | In | Ga | As | Fe |
|---|---|---|---|---|---|---|---|---|---|---|---|
| Ex. 1 | Ba | 0.10 | 0.70 | 0.04 | 5.1 | 1.0 | 0.008 | | | | |
| Ex. 2 | Bal. | 1.40 | 0.70 | 0.04 | 5.1 | 1.0 | 0.008 | | | | |
| Ex. 3 | Bal. | 2.00 | 0.70 | 0.04 | 5.1 | 1.0 | 0.008 | | | | |
| Ex. 4 | Bal. | 3.00 | 0.70 | 0.04 | 5.1 | 1.0 | 0.008 | | | | |
| Ex. 5 | Bal. | 3.40 | 0.70 | 0.04 | 5.1 | 1.0 | 0.008 | | | | |
| Ex. 6 | Bal. | 3.90 | 0.70 | 0.04 | 5.1 | 1.0 | 0.008 | | | | |
| Ex. 7 | Bal. | 3.40 | 0.10 | 0.04 | 5.1 | 1.0 | 0.008 | | | | |
| Ex. 8 | Bal. | 3.40 | 0.30 | 0.04 | 5.1 | 1.0 | 0.008 | | | | |
| Ex. 9 | Bal. | 3.40 | 0.50 | 0.04 | 5.1 | 1.0 | 0.008 | | | | |
| Ex. 10 | Bal. | 3.40 | 1.00 | 0.04 | 5.1 | 1.0 | 0.008 | | | | |
| Ex. 11 | Bal. | 3.40 | 0.70 | 0.04 | 5.1 | 0.6 | 0.008 | | | | |
| Ex. 12 | Bal. | 3.40 | 0.70 | 0.04 | 5.3 | 0.6 | 0.008 | | | | |
| Ex. 13 | Bal. | 3.40 | 0.70 | 0.04 | 5.5 | 0.6 | 0.008 | | | | |
| Ex. 14 | Bal. | 3.40 | 0.70 | 0.04 | 5.7 | 0.6 | 0.008 | | | | |
| Ex. 15 | Bal. | 3.40 | 0.70 | 0.04 | 6.0 | 0.6 | 0.008 | | | | |
| Ex. 16 | Bal. | 3.40 | 0.70 | 0.04 | 7.0 | 0.6 | 0.008 | | | | |
| Ex. 17 | Bal. | 3.40 | 0.70 | 0.04 | 7.9 | 0.6 | 0.008 | | | | |
| Ex. 18 | Bal. | 3.40 | 0.70 | 0.04 | 5.1 | 0.8 | 0.008 | | | | |
| Ex. 19 | Bal. | 3.40 | 0.70 | 0.04 | 5.3 | 0.8 | 0.008 | | | | |
| Ex. 20 | Bal. | 3.40 | 0.70 | 0.04 | 5.5 | 0.8 | 0.008 | | | | |
| Ex. 21 | Bal. | 3.40 | 0.70 | 0.04 | 5.7 | 0.8 | 0.008 | | | | |
| Ex. 21 | Bal. | 3.40 | 0.70 | 0.04 | 6.0 | 0.8 | 0.008 | | | | |
| Ex. 23 | Bal. | 3.40 | 0.70 | 0.04 | 5.3 | 1.0 | 0.008 | | | | |
| Ex. 24 | Bal. | 3.40 | 0.70 | 0.04 | 5.5 | 1.0 | 0.008 | | | | |
| Ex. 25 | Bal. | 3.40 | 0.70 | 0.04 | 5.7 | 1.0 | 0.008 | | | | |
| Ex. 26 | Bal. | 3.40 | 0.70 | 0.04 | 6.0 | 1.0 | 0.008 | | | | |
| Ex. 27 | Bal. | 3.40 | 0.70 | 0.04 | 7.0 | 1.0 | 0.008 | | | | |
| Ex. 28 | Bal. | 3.40 | 0.70 | 0.04 | 7.9 | 1.0 | 0.008 | | | | |

TABLE 1-continued

| | | | | | | | | Pd | Mn | Zn | Zr |
|---|---|---|---|---|---|---|---|---|---|---|---|
| Ex. 29 | Bal. | 3.40 | 0.70 | 0.04 | 5.1 | 1.2 | 0.008 | | | | |
| Ex. 30 | Bal. | 3.40 | 0.70 | 0.04 | 5.3 | 1.2 | 0.008 | | | | |
| Ex. 31 | Bal. | 3.40 | 0.70 | 0.04 | 5.5 | 1.2 | 0.008 | | | | |
| Ex. 32 | Bal. | 3.40 | 0.70 | 0.04 | 5.7 | 1.2 | 0.008 | | | | |
| Ex. 33 | Bal. | 3.40 | 0.70 | 0.04 | 6.0 | 1.2 | 0.008 | | | | |
| Ex. 34 | Bal. | 3.40 | 0.70 | 0.04 | 5.1 | 1.4 | 0.008 | | | | |
| Ex. 35 | Bal. | 3.40 | 0.70 | 0.04 | 5.3 | 1.4 | 0.008 | | | | |
| Ex. 36 | Bal. | 3.40 | 0.70 | 0.04 | 5.5 | 1.4 | 0.008 | | | | |
| Ex. 37 | Bal. | 3.40 | 0.70 | 0.04 | 5.7 | 1.4 | 0.008 | | | | |
| Ex. 38 | Bal. | 3.40 | 0.70 | 0.04 | 6.0 | 1.4 | 0.008 | | | | |
| Ex. 39 | Bal. | 3.40 | 0.70 | 0.04 | 7.0 | 1.4 | 0.008 | | | | |
| Ex. 40 | Bal. | 3.40 | 0.70 | 0.04 | 7.9 | 1.4 | 0.008 | | | | |
| Ex. 41 | Bal. | 3.40 | 0.70 | 0.01 | 5.1 | 1.0 | 0.008 | | | | |
| Ex. 42 | Bal. | 3.40 | 0.70 | 0.64 | 5.1 | 1.0 | 0.008 | | | | |
| Ex. 43 | Bal. | 3.40 | 0.70 | 0.10 | 5.1 | 1.0 | 0.008 | | | | |
| Ex. 44 | Bal. | 3.40 | 0.70 | 0.04 | 5.1 | 1.0 | 0.001 | | | | |
| Ex. 45 | Bal. | 3.40 | 0.70 | 0.04 | 5.1 | 1.0 | 0.010 | | | | |
| Ex. 46 | Bal. | 3.40 | 0.70 | 0.04 | 5.1 | 1.0 | 0.050 | | | | |
| Ex. 47 | Bal. | 3.40 | 0.70 | 0.04 | 5.1 | 1.0 | 0.090 | | | | |
| Ex. 48 | Bal. | 3.40 | 0.70 | 0.04 | 5.1 | 1.0 | 0.100 | | | | |
| Ex. 49 | Bal. | 3.40 | 0.70 | 0.04 | 5.1 | 1.0 | 0.008 | 0.010 | | | |
| Ex. 50 | Bal. | 3.40 | 0.70 | 0.04 | 5.1 | 1.0 | 0.008 | | 0.010 | | |
| Ex. 51 | Bal. | 3.40 | 0.70 | 0.04 | 5.1 | 1.0 | 0.008 | | | 0.010 | |
| Ex. 52 | Bal. | 3.40 | 0.70 | 0.04 | 5.1 | 1.0 | 0.008 | | | | 0.010 |
| Ex. 53 | Bal. | 3.40 | 0.70 | 0.04 | 5.1 | 1.0 | 0.008 | | | | |

| | ALLOY COMPOSITION (MASS %) | | | | | RELATION | RELATION | RELATION | RELATION |
|---|---|---|---|---|---|---|---|---|---|
| | Pd | Mn | Zn | Zr | Mg | (1) | (2) | (3) | (4) |
| Ex. 1 | | | | | | 219 | 0.20 | 18.2 | 0.00163 |
| Ex. 2 | | | | | | 3063 | 0.20 | 13.0 | 0.00163 |
| Ex. 3 | | | | | | 4375 | 0.20 | 17.9 | 0.00163 |
| Ex. 4 | | | | | | 6563 | 0.20 | 17.7 | 8.00163 |
| Ex. 5 | | | | | | 7438 | 0.20 | 17.6 | 8.00163 |
| Ex. 6 | | | | | | 8531 | 0.20 | 17.5 | 0.00163 |
| Ex. 7 | | | | | | 1083 | 0.20 | 17.7 | 0.00163 |
| Ex. 8 | | | | | | 3188 | 0.20 | 17.7 | 0.00163 |
| Ex. 9 | | | | | | 5313 | 0.20 | 17.6 | 0.00163 |
| Ex. 10 | | | | | | 10625 | 0.20 | 17.5 | 0.00163 |
| Ex. 11 | | | | | | 7438 | 0.12 | 17.7 | 0.00098 |
| Ex. 12 | | | | | | 7438 | 0.11 | 17.0 | 0.00102. |
| Ex. 13 | | | | | | 7438 | 0.12 | 16.3 | 0.00106 |
| Ex. 14 | | | | | | 7438 | 0.12 | 15.7 | 8.00108 |
| Ex. 15 | | | | | | 7438 | 0.10 | 14.9 | 0.00115 |
| Ex. 16 | | | | | | 7438 | 0.09 | 12.6 | 0.00134 |
| Ex. 17 | | | | | | 7438 | 0.08 | 11.1 | 0.00152 |
| Ex. 18 | | | | | | 7438 | 0.16 | 17.6 | 0.00131 |
| Ex. 19 | | | | | | 7438 | 0.15 | 16.9 | 0.00136 |
| Ex. 20 | | | | | | 7438 | 0.15 | 16.3 | 0.00141 |
| Ex. 21 | | | | | | 7438 | 0.14 | 15.7 | 0.00146 |
| Ex. 21 | | | | | | 7438 | 0.13 | 14.8 | 0.00154 |
| Ex. 23 | | | | | | 7438 | 0.19 | 16.9 | 0.00170 |
| Ex. 24 | | | | | | 7438 | 0.18 | 16.2 | 0.00176 |
| Ex. 25 | | | | | | 7438 | 0.18 | 15.6 | 0.00182 |
| Ex. 26 | | | | | | 7438 | 0.17 | 14.8 | 0.00192 |
| Ex. 27 | | | | | | 7438 | 0.14 | 12.6 | 0.00224 |
| Ex. 28 | | | | | | 7438 | 0.13 | 11.0 | 0.00253 |
| Ex. 29 | | | | | | 7438 | 0.24 | 17.6 | 0.00196 |
| Ex. 30 | | | | | | 7438 | 0.23 | 16.9 | 0.00204 |
| Ex. 31 | | | | | | 7438 | 0.22 | 16.2 | 0.00211 |
| Ex. 32 | | | | | | 7438 | 0.21 | 15.6 | 0.00219 |
| Ex. 33 | | | | | | 7438 | 0.20 | 14.8 | 0.00230 |
| Ex. 34 | | | | | | 7438 | 0.27 | 17.5 | 0.00228 |
| Ex. 35 | | | | | | 7438 | 0.26 | 16.8 | 0.00237 |
| Ex. 36 | | | | | | 7438 | 0.25 | 16.2 | 0.00246 |
| Ex. 37 | | | | | | 7438 | 0.25 | 15.6 | 0.00255 |
| Ex. 38 | | | | | | 7438 | 0.23 | 14.7 | 0.00269 |
| Ex. 39 | | | | | | 7438 | 0.20 | 12.5 | 0.00314 |
| Ex. 40 | | | | | | 7438 | 0.18 | 11.0 | 0.00354 |
| Ex. 41 | | | | | | 29750 | 0.20 | 17.6 | 0.00041 |
| Ex. 42 | | | | | | 4958 | 0.20 | 17.6 | 0.00245 |
| Ex. 43 | | | | | | 2975 | 0.20 | 17.6 | 0.00408 |
| Ex. 44 | | | | | | 59500 | 0.20 | 17.6 | 0.00020 |
| Ex. 45 | | | | | | 5950 | 0.20 | 17.6 | 0.00204 |
| Ex. 46 | | | | | | 1190 | 0.20 | 17.6 | 0.01020 |
| Ex. 47 | | | | | | 661 | 0.20 | 17.6 | 0.01836 |
| Ex. 48 | | | | | | 595 | 0.20 | 17.6 | 0.02040 |
| Ex. 49 | | | | | | 7438 | 0.20 | 17.6 | 0.00163 |
| Ex. 50 | | | | | | 7438 | 0.20 | 17.6 | 0.00163 |

TABLE 1-continued

| | | | | | |
|---|---|---|---|---|---|
| Ex. 51 | | 7438 | 0.20 | 17.6 | 0.00163 |
| Ex. 52 | | 7438 | 0.20 | 17.6 | 0.00163 |
| Ex. 53 | 0.010 | 7438 | 0.20 | 17.6 | 0.00163 |

Ex. = Example

TABLE 2

| | ALLOY COMPOSITION (MASS %) | | | | | | | | | | | | | | | | Relation | Relation | Relation | Relation |
|---|---|---|---|---|---|---|---|---|---|---|---|---|---|---|---|---|---|---|---|---|
| | Sn | Ag | Cu | Ni | Sb | Bi | Co | In | Ga | As | Fe | Pd | Mn | Zn | Zr | Mg | (1) | (2) | (3) | (4) |
| Ex. 54 | Bal. | 3.40 | 0.70 | 0.04 | 5.1 | 1.0 | 0.008 | | | | | | 0.010 | | | | 7438 | 0.20 | 17.6 | 0.00163 |
| Ex. 55 | Bal. | 3.40 | 0.70 | 0.04 | 5.1 | 1.0 | 0.008 | | | | | | | 0.010 | | | 7438 | 0.20 | 17.6 | 0.00163 |
| Ex. 56 | Bal. | 3.40 | 0.70 | 0.04 | 5.1 | 1.0 | 0.008 | | | | | | | | 0.010 | | 7438 | 0.20 | 17.6 | 0.00163 |
| Ex. 57 | Bal. | 3.40 | 0.70 | 0.04 | 5.1 | 1.0 | 0.008 | | | | | | | | | 0.010 | 7438 | 0.20 | 17.6 | 0.00163 |
| Ex. 58 | Bal. | 3.40 | 0.70 | 0.04 | 5.1 | 1.0 | 0.008 | 0.010 | 0.010 | 0.010 | 0.010 | 0.010 | 0.010 | 0.010 | 0.010 | 0.010 | 7438 | 0.20 | 17.6 | 0.00163 |
| Comp. Ex. 1 | Bal. | 0.04 | 0.70 | 0.04 | 5.1 | 1.0 | 0.008 | | | | | | | | | | 88 | 0.20 | 18.3 | 0.00163 |
| Comp. Ex. 2 | Bal. | 4.00 | 0.70 | 0.04 | 5.1 | 1.0 | 0.008 | | | | | | | | | | 8750 | 0.20 | 17.5 | 0.00163 |
| Comp. Ex. 3 | Bal. | 3.40 | 0.04 | 0.04 | 5.1 | 1.0 | 0.008 | | | | | | | | | | 425 | 0.20 | 17.7 | 0.00163 |
| Comp. Ex. 4 | Bal. | 3.40 | 1.10 | 0.04 | 5.1 | 1.0 | 0.008 | | | | | | | | | | 11688 | 0.20 | 17.5 | 0.00163 |
| Comp. Ex. 5 | Bal. | 3.40 | 0.70 | 0.004 | 5.1 | 1.0 | 0.008 | | | | | | | | | | 74375 | 0.20 | 17.6 | 0.00016 |
| Comp. Ex. 6 | Bal. | 3.40 | 0.70 | 0.31 | 5.1 | 1.0 | 0.008 | | | | | | | | | | 960 | 0.20 | 17.5 | 0.01265 |
| Comp. Ex. 7 | Bal. | 3.00 | 0.70 | 0.04 | 5.0 | 1.0 | 0.008 | | | | | | | | | | 6563 | 0.20 | 18.1 | 0.00160 |
| Comp. Ex. 8 | Bal. | 3.40 | 0.70 | 0.04 | 8.0 | 1.0 | 0.008 | | | | | | | | | | 7438 | 0.13 | 10.9 | 0.00256 |
| Comp. Ex. 9 | Bal. | 3.40 | 0.70 | 0.06 | 6.0 | 0.5 | 0.008 | | | | | | | | | | 4958 | 0.08 | 14.9 | 0.00144 |
| Comp. Ex. 10 | Bal. | 3.40 | 0.70 | 0.04 | 5.1 | 1.5 | 0.008 | | | | | | | | | | 7438 | 0.29 | 17.5 | 0.00245 |
| Comp. Ex. 11 | Bal. | 3.40 | 0.70 | 0.04 | 5.1 | 1.0 | 0.0004 | | | | | | | | | | 148750 | 0.20 | 17.6 | 0.00008 |
| Comp. Ex. 12 | Bal. | 3.40 | 0.70 | 0.04 | 5.1 | 1.0 | 0.110 | | | | | | | | | | | | | |
| Comp. Ex. 13 | Bal. | 3.00 | 0.50 | 0.05 | 3.5 | 7.0 | 0.030 | 0.200 | | | | | | | | | | | | |
| Comp. Ex. 14 | Bal. | 3.50 | 0.70 | 0.05 | 4.0 | 3.1 | 0.050 | | | | | | | | | | | | | |
| Comp. Ex. 15 | Bal. | 3.54 | 1.04 | 0.05 | 3.46 | 0.29 | 0.050 | | | | | | | | | | | | | |

TABLE 2-continued

| | | | | |
|---|---|---|---|---|
| Ex. 11 | | | | |
| Comp. Ex. 12 | 541 | 0.20 | 17.6 | 0.02244 |
| Comp. Ex. 13 | 1000 | 2.00 | 24.5 | 0.03675 |
| Comp. Ex. 14 | 980 | 0.78 | 22.2 | 0.03100 |
| Comp. Ex. 15 | 1473 | 0.08 | 26.5 | 0.00251 |

Ex. = Example

Comp. Ex. = Comparative Example

* The underline indicates that it does not fall within the scope of the present invention.

TABLE 3

| | EVALUATION 1 | | | | | | | | |
|---|---|---|---|---|---|---|---|---|---|
| | SOLIDUS-LINE TEMPERATURE (°C.) | LIQUIDUS-LINE TEMPERATURE (°C.) | TEMPERATURE JUDGEMENT | EVALUATION 2 WETTABILITY JUDGEMENT | EVALUATION 3 TENSILE STRENGTH | EVALUATION 4 SHEAR STRENGTH | EVALUATION 5 HSS SHEAR TEST | EVALUATION 6 DROP IMPACT RESISTANCE | COMPREHENSIVE EVALUATION |
| Ex. 1 | 215 | 233 | EXCELLENT | GOOD | EXCELLENT | GOOD | EXCELLENT | EXCELLENT | EXCELLENT |
| Ex. 2 | 215 | 228 | EXCELLENT | EXCELLENT | EXCELLENT | EXCELLENT | EXCELLENT | EXCELLENT | EXCELLENT |
| Ex. 3 | 215 | 225 | EXCELLENT | EXCELLENT | EXCELLENT | EXCELLENT | EXCELLENT | EXCELLENT | EXCELLENT |
| Ex. 4 | 215 | 221 | EXCELLENT | EXCELLENT | EXCELLENT | EXCELLENT | EXCELLENT | EXCELLENT | EXCELLENT |
| Ex. 5 | 215 | 220 | EXCELLENT | EXCELLENT | EXCELLENT | EXCELLENT | EXCELLENT | EXCELLENT | EXCELLENT |
| Ex. 6 | 215 | 231 | EXCELLENT | EXCELLENT | EXCELLENT | EXCELLENT | GOOD | GOOD | GOOD |
| Ex. 7 | 215 | 224 | EXCELLENT | EXCELLENT | EXCELLENT | EXCELLENT | EXCELLENT | EXCELLENT | EXCELLENT |
| Ex. 8 | 215 | 223 | EXCELLENT | EXCELLENT | EXCELLENT | EXCELLENT | EXCELLENT | EXCELLENT | EXCELLENT |
| Ex. 9 | 215 | 221 | EXCELLENT | EXCELLENT | EXCELLENT | EXCELLENT | EXCELLENT | EXCELLENT | EXCELLENT |
| Ex. 10 | 215 | 218 | EXCELLENT | EXCELLENT | EXCELLENT | EXCELLENT | GOOD | GOOD | GOOD |
| Ex. 11 | 217 | 221 | EXCELLENT | EXCELLENT | EXCELLENT | EXCELLENT | EXCELLENT | EXCELLENT | EXCELLENT |
| Ex. 12 | 217 | 221 | EXCELLENT | EXCELLENT | EXCELLENT | EXCELLENT | EXCELLENT | EXCELLENT | EXCELLENT |
| Ex. 13 | 217 | 222 | EXCELLENT | EXCELLENT | EXCELLENT | EXCELLENT | EXCELLENT | EXCELLENT | EXCELLENT |
| Ex. 14 | 217 | 222 | EXCELLENT | EXCELLENT | EXCELLENT | EXCELLENT | EXCELLENT | EXCELLENT | EXCELLENT |
| Ex. 15 | 217 | 223 | EXCELLENT | EXCELLENT | EXCELLENT | EXCELLENT | EXCELLENT | EXCELLENT | EXCELLENT |
| Ex. 16 | 217 | 225 | EXCELLENT | GOOD | EXCELLENT | EXCELLENT | EXCELLENT | EXCELLENT | GOOD |
| Ex. 17 | 217 | 234 | EXCELLENT | GOOD | EXCELLENT | EXCELLENT | EXCELLENT | EXCELLENT | GOOD |
| Ex. 18 | 216 | 220 | EXCELLENT | EXCELLENT | EXCELLENT | EXCELLENT | EXCELLENT | EXCELLENT | EXCELLENT |
| Ex. 19 | 216 | 220 | EXCELLENT | EXCELLENT | EXCELLENT | EXCELLENT | EXCELLENT | EXCELLENT | EXCELLENT |
| Ex. 20 | 216 | 220 | EXCELLENT | EXCELLENT | EXCELLENT | EXCELLENT | EXCELLENT | EXCELLENT | EXCELLENT |
| Ex. 21 | 216 | 221 | EXCELLENT | EXCELLENT | EXCELLENT | EXCELLENT | EXCELLENT | EXCELLENT | EXCELLENT |
| Ex. 22 | 216 | 221 | EXCELLENT | EXCELLENT | EXCELLENT | EXCELLENT | EXCELLENT | EXCELLENT | EXCELLENT |
| Ex. 23 | 215 | 220 | EXCELLENT | EXCELLENT | EXCELLENT | EXCELLENT | EXCELLENT | EXCELLENT | EXCELLENT |
| Ex. 24 | 215 | 220 | EXCELLENT | EXCELLENT | EXCELLENT | EXCELLENT | EXCELLENT | EXCELLENT | EXCELLENT |
| Ex. 25 | 215 | 220 | EXCELLENT | EXCELLENT | EXCELLENT | EXCELLENT | EXCELLENT | EXCELLENT | EXCELLENT |
| Ex. 26 | 215 | 220 | EXCELLENT | EXCELLENT | EXCELLENT | EXCELLENT | EXCELLENT | EXCELLENT | EXCELLENT |

TABLE 3-continued

| | SOLIDUS-LINE TEMPERATURE (° C.) | LIQUIDUS-LINE TEMPERATURE (° C.) | TEMPERATURE JUDGEMENT | EVALUATION 2 WETTABILITY JUDGEMENT | EVALUATION 3 TENSILE STRENGTH | EVALUATION 4 SHEAR STRENGTH | EVALUATION 5 HSS SHEAR TEST | EVALUATION 6 DROP IMPACT RESISTANCE | COMPREHENSIVE EVALUATION |
|---|---|---|---|---|---|---|---|---|---|
| Ex. 27 | 215 | 225 | EXCELLENT | EXCELLENT | EXCELLENT | EXCELLENT | EXCELLENT | EXCELLENT | EXCELLENT |
| Ex. 28 | 215 | 234 | EXCELLENT | EXCELLENT | EXCELLENT | EXCELLENT | EXCELLENT | EXCELLENT | EXCELLENT |
| Ex. 29 | 214 | 220 | EXCELLENT | EXCELLENT | EXCELLENT | EXCELLENT | EXCELLENT | EXCELLENT | EXCELLENT |
| Ex. 30 | 214 | 220 | EXCELLENT | EXCELLENT | EXCELLENT | EXCELLENT | EXCELLENT | EXCELLENT | EXCELLENT |
| Ex. 31 | 214 | 220 | EXCELLENT | EXCELLENT | EXCELLENT | EXCELLENT | EXCELLENT | EXCELLENT | EXCELLENT |
| Ex. 32 | 214 | 220 | EXCELLENT | EXCELLENT | EXCELLENT | EXCELLENT | EXCELLENT | EXCELLENT | EXCELLENT |
| Ex. 33 | 214 | 220 | EXCELLENT | EXCELLENT | EXCELLENT | EXCELLENT | EXCELLENT | EXCELLENT | EXCELLENT |
| Ex. 34 | 213 | 219 | EXCELLENT | EXCELLENT | EXCELLENT | EXCELLENT | EXCELLENT | EXCELLENT | EXCELLENT |
| Ex. 35 | 213 | 219 | EXCELLENT | EXCELLENT | EXCELLENT | EXCELLENT | EXCELLENT | EXCELLENT | EXCELLENT |
| Ex. 36 | 213 | 219 | EXCELLENT | EXCELLENT | EXCELLENT | EXCELLENT | EXCELLENT | EXCELLENT | EXCELLENT |
| Ex. 37 | 213 | 220 | EXCELLENT | EXCELLENT | EXCELLENT | EXCELLENT | GOOD | EXCELLENT | GOOD |
| Ex. 39 | 213 | 220 | EXCELLENT | EXCELLENT | EXCELLENT | EXCELLENT | GOOD | EXCELLENT | GOOD |
| Ex. 39 | 213 | 225 | EXCELLENT | EXCELLENT | EXCELLENT | EXCELLENT | GOOD | EXCELLENT | GOOD |
| Ex. 40 | 213 | 234 | EXCELLENT | EXCELLENT | EXCELLENT | EXCELLENT | GOOD | EXCELLENT | GOOD |
| Ex. 41 | 215 | 220 | EXCELLENT | EXCELLENT | EXCELLENT | EXCELLENT | GOOD | EXCELLENT | GOOD |
| Ex. 42 | 215 | 220 | EXCELLENT | EXCELLENT | EXCELLENT | EXCELLENT | EXCELLENT | EXCELLENT | EXCELLENT |
| Ex. 43 | 215 | 238 | GOOD | EXCELLENT | EXCELLENT | EXCELLENT | EXCELLENT | EXCELLENT | GOOD |
| Ex. 44 | 215 | 220 | EXCELLENT | EXCELLENT | EXCELLENT | GOOD | EXCELLENT | EXCELLENT | GOOD |
| Ex. 45 | 215 | 220 | EXCELLENT | EXCELLENT | EXCELLENT | EXCELLENT | EXCELLENT | EXCELLENT | EXCELLENT |
| Ex. 46 | 215 | 237 | GOOD | EXCELLENT | EXCELLENT | EXCELLENT | EXCELLENT | EXCELLENT | GOOD |
| Ex. 47 | 214 | 248 | GOOD | EXCELLENT | EXCELLENT | EXCELLENT | EXCELLENT | EXCELLENT | GOOD |
| Ex. 48 | 214 | 249 | GOOD | EXCELLENT | EXCELLENT | EXCELLENT | EXCELLENT | EXCELLENT | GOOD |
| Ex. 49 | 215 | 220 | EXCELLENT | EXCELLENT | EXCELLENT | EXCELLENT | EXCELLENT | EXCELLENT | EXCELLENT |
| Ex. 50 | 215 | 220 | EXCELLENT | EXCELLENT | EXCELLENT | EXCELLENT | EXCELLENT | EXCELLENT | EXCELLENT |
| Ex. 51 | 215 | 220 | EXCELLENT | EXCELLENT | EXCELLENT | EXCELLENT | EXCELLENT | EXCELLENT | EXCELLENT |
| Ex. 52 | 215 | 220 | EXCELLENT | EXCELLENT | EXCELLENT | EXCELLENT | EXCELLENT | EXCELLENT | EXCELLENT |
| Ex. 53 | 215 | 220 | EXCELLENT | EXCELLENT | EXCELLENT | EXCELLENT | EXCELLENT | EXCELLENT | EXCELLENT |

Ex. = Example

TABLE 4

| | EVALUATION 1 | | | EVALUATION 2 | EVALUATION 3 | EVALUATION 4 | EVALUATION 5 | EVALUATION 6 | |
| | SOLIDUS-LINE TEMPERATURE (° C.) | LIQUIDUS-LINE TEMPERATURE (° C.) | TEMPERATURE JUDGMENT | WETTABILITY JUDGMENT | TENSILE STRENGTH | SHEAR STRENGTH | HSS SHEAR TEST | DROP IMPACT RESISTANCE | COMPREHENSIVE EVALUATION |
|---|---|---|---|---|---|---|---|---|---|
| Ex. 54 | 215 | 220 | EXCELLENT | EXCELLENT | EXCELLENT | EXCELLENT | EXCELLENT | EXCELLENT | EXCELLENT |
| Ex. 55 | 215 | 220 | EXCELLENT | EXCELLENT | EXCELLENT | EXCELLENT | EXCELLENT | EXCELLENT | EXCELLENT |
| Ex. 56 | 215 | 220 | EXCELLENT | EXCELLENT | EXCELLENT | EXCELLENT | EXCELLENT | EXCELLENT | EXCELLENT |
| Ex. 57 | 215 | 220 | EXCELLENT | EXCELLENT | EXCELLENT | EXCELLENT | EXCELLENT | EXCELLENT | EXCELLENT |
| Ex. 58 | 215 | 220 | EXCELLENT | EXCELLENT | EXCELLENT | EXCELLENT | EXCELLENT | EXCELLENT | EXCELLENT |
| Comp. Ex. 1 | 215 | 233 | EXCELLENT | POOR | GOOD | GOOD | EXCELLENT | EXCELLENT | POOR |
| Comp. Ex. 2 | 215 | 231 | EXCELLENT | EXCELLENT | EXCELLENT | EXCELLENT | POOR | POOR | POOR |
| Comp. Ex. 3 | 215 | 224 | EXCELLENT | POOR | EXCELLENT | GOOD | EXCELLENT | EXCELLENT | POOR |
| Comp. Ex. 4 | 215 | 221 | EXCELLENT | POOR | POOR | POOR | POOR | GOOD | POOR |
| Comp. Ex. 5 | 215 | 219 | EXCELLENT | EXCELLENT | EXCELLENT | EXCELLENT | POOR | POOR | POOR |
| Comp. Ex. 6 | 215 | 400 | POOR | POOR | POOR | POOR | POOR | POOR | POOR |
| Comp. Ex. 7 | 215 | 221 | EXCELLENT | EXCELLENT | POOR | EXCELLENT | EXCELLENT | EXCELLENT | POOR |

TABLE 4-continued

| | EVALUATION 1 | | | EVALUATION 2 | EVALUATION 3 | EVALUATION 4 | EVALUATION 5 | EVALUATION 6 | | COMPREHENSIVE EVALUATION |
| | SOLIDUS-LINE TEMPERATURE (° C.) | LIQUIDUS-LINE TEMPERATURE (° C.) | TEMPERATURE JUDGMENT | WETTABILITY JUDGMENT | TENSILE STRENGTH | SHEAR STRENGTH | HSS SHEAR TEST | SOLIDUS-LINE TEMPERATURE (° C.) | LIQUIDUS-LINE TEMPERATURE (° C.) | |
|---|---|---|---|---|---|---|---|---|---|---|
| Comp. Ex. 8 | 215 | 234 | EXCELLENT | POOR | EXCELLENT | EXCELLENT | POOR | POOR | POOR | POOR |
| Comp. Ex. 9 | 217 | 222 | EXCELLENT | POOR | EXCELLENT | EXCELLENT | EXCELLENT | EXCELLENT | POOR | POOR |
| Comp. Ex. 10 | 213 | 219 | EXCELLENT | EXCELLENT | EXCELLENT | EXCELLENT | POOR | GOOD | POOR | POOR |
| Comp. Ex. 11 | 215 | 220 | EXCELLENT | EXCELLENT | EXCELLENT | POOR | EXCELLENT | EXCELLENT | POOR | POOR |
| Comp. Ex. 12 | 214 | 250 | GOOD | POOR | EXCELLENT | EXCELLENT | EXCELLENT | EXCELLENT | POOR | POOR |
| Comp. Ex. 13 | 192 | 217 | POOR | EXCELLENT | EXCELLENT | EXCELLENT | POOR | POOR | POOR | POOR |
| Comp. Ex. 14 | 207 | 222 | POOR | EXCELLENT | EXCELLENT | EXCELLENT | POOR | POOR | POOR | POOR |
| Comp. Ex. 15 | 217 | 219 | EXCELLENT | POOR | POOR | POOR | POOR | GOOD | POOR | POOR |

Ex. = Example;
Comp. Ex. = Comparative Example

As shown in Table 1, with Examples 1 to 58, results of levels acceptable for practical use were obtained in all evaluations. Among these, all of the examples satisfying the relations (1) to (4) exhibited the highest evaluations under the criteria given above.

On the other hand, Comparative Example 1 was poor in wettability due to Ag content being low. Comparative Example 2 was that joint interface fracture occurred in the HSS shear test and the drop impact resistance was also poor due to the Ag content being high.

Comparative Example 3 was poor in wettability due to Cu content being low. Comparative Example 4 was that the wettability, tensile strength, and shear strength were poor and joint interface fracture occurred in the HSS shear test due to the Cu content being high.

Comparative Example 5 was that the drop impact resistance was poor and joint interface fracture occurred in the HSS shear test due to the Ni content being low. Comparative Example 6 was poor in all evaluation items due to the Ni content being too high.

Comparative Example 7 was poor in tensile strength due to being low in Sb content. Comparative Example 8 was that the wettability was poor and joint interface fracture occurred in the HSS shear test due to the Sb content being high.

Comparative Example 9 was poor in wettability due to Bi content being low. Comparative Example 10 was that the joint interface fracture occurred in the HSS shear test due to the Bi content being high.

Comparative Example 11 was poor in shear strength due to Co content being low. Comparative Example 12 was poor in wettability due to Co content being high.

Comparative Example 13 and Comparative Example 14 were that the joint interface fracture occurred in the HSS shear test and the drop impact resistance was also poor due to the Sb content being low and the Bi content being high. Comparative Example 15 was that the wettability, tensile strength, and shear strength were poor and joint interface fracture occurred in the HSS shear test due to the Cu content being high and both the Sb and Bi contents being low.

Figure 2:
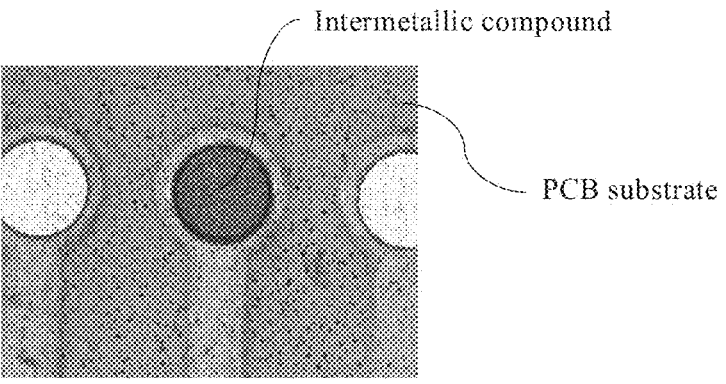
FIG. 2 is an optical micrograph of a PCB substrate surface after the HSS shear test in Comparative Example 8.

FIG. 1 is an optical micrograph of the PCB substrate surface after the HSS shear test of Example 5 and FIG. 2 is an optical micrograph of the PCB substrate surface after the HSS shear test of Comparative Example 8. As is clear from FIG. 1, it was found, from the remaining of the solder alloy on the electrode, that bulk fracture occurred in Example 5. On the other hand, in FIG. 2, since the solder alloy does not remain and the intermetallic compound is exposed, it was found that joint interface fracture occurred. It was also confirmed for the examples other than Example 5 that bulk fracture or bulk fracture and joint interface fracture occurred.

The invention claimed is:

1. A solder alloy having an alloy composition consisting of, by mass %,
Ag: 0.1 to 3.9%,
Cu: 0.1 to 1.0%,
Bi: 0.6 to 1.4%,
Sb: 5.1 to 7.9%,
Ni: 0.01 to 0.30%,
Co: 0.001 to 0.100%, with the balance being Sn,
wherein, in an evaluation of wettability, the solder alloy exhibits an average value of zero cross times (sec) of 1.5 seconds or less under the following test conditions: immersion speed into a solder bath: 10 mm/sec;
immersion depth into the solder bath: 4 mm;
immersion time into the solder bath: 10 sec;
the solder bath temperature: 255° C.; and wherein, in an evaluation of high-speed shear test, a fracture mode after the high-speed shear test was performed at a shear speed of 4000 mm/sec is: (a) bulk fracture and joint interface fracture or (b) bulk fracture.

2. A solder alloy having an alloy composition consisting of, by mass %,
Ag: 0.1 to 3.9%,
Cu: 0.1 to 1.0%,
Bi: 0.6 to 1.4%,
Sb: 5.1 to 7.9%,
Ni: 0.01 to 0.30%,
at least one of In, Ga, As, Fe, Pd, Mn, Zn, Zr, and Mg: 0.1% or less in total,
Co: 0.001 to 0.100%, with the balance being Sn,
wherein, in an evaluation of wettability, the solder alloy exhibits an average value of zero cross times (sec) of 1.5 seconds or less under the following test conditions: immersion speed into a solder bath: 10 mm/sec;
immersion depth into the solder bath: 4 mm;
immersion time into the solder bath: 10 sec;
the solder bath temperature: 255° C.; and
wherein, in an evaluation of high-speed shear test, a fracture mode after the high-speed shear test was performed at a shear speed of 4000 mm/sec is: (a) bulk fracture and joint interface fracture or (b) bulk fracture.

3. The solder alloy according to claim 1, wherein the alloy composition satisfies at least one of the following relations (1) to (4):

$$426 \leq (Ag \times Cu)/(Ni \times Co) \leq 8530 \qquad \text{Relation (1)}$$

$$0.10 \leq Bi/Sb \leq 0.28 \qquad \text{Relation (2)}$$

$$10.8 \leq Sn/Sb \leq 18.0 \qquad \text{Relation (3)}$$

$$0.00004 \leq Bi \times Sb \times Ni \times Co \leq 0.00254 \qquad \text{Relation (4)}$$

wherein Sn, Ag, Cu, Bi, Sb, Ni, and Co in the relations (1) to (4) each represent the content in mass % thereof in the solder alloy.

4. A solder paste comprising the solder alloy according to claim 1.

5. A solder joint comprising the solder alloy according to claim 1.

6. The solder alloy according to claim 2, wherein the alloy composition satisfies at least one of the following relations (1) to (4):

$$426 \leq (Ag \times Cu)/(Ni \times Co) \leq 8530 \qquad \text{Relation (1)}$$

$$0.10 \leq Bi/Sb \leq 0.28 \qquad \text{Relation (2)}$$

$$10.8 \leq Sn/Sb \leq 18.0 \qquad \text{Relation (3)}$$

$$0.00004 \leq Bi \times Sb \times Ni \times Co \leq 0.00254 \qquad \text{Relation (4)}$$

wherein Sn, Ag, Cu, Bi, Sb, Ni, and Co in the relations (1) to (4) each represents the content in mass % thereof in the solder alloy.

7. A solder paste comprising the solder alloy according to claim 2.

8. A solder joint comprising the solder alloy according to claim 2.

* * * * *